US009401036B2

(12) United States Patent
Sun et al.

(10) Patent No.: US 9,401,036 B2
(45) Date of Patent: Jul. 26, 2016

(54) PHOTOGRAPHING APPARATUS AND METHOD

(71) Applicants: HISENSE ELECTRIC CO., LTD., Qingdao, Shandong (CN); HISENSE USA CORPORATION, Suwanee, GA (US); HISENSE INTERNATIONAL CO., LTD., Qingdao, Shandong (CN)

(72) Inventors: Xuebin Sun, Shandong (CN); Jin Liu, Shandong (CN); Benyou Li, Shandong (CN)

(73) Assignees: HISENSE ELECTRIC CO., LTD., Qingdao, Shandong (CN); HISENSE USA CORPORATION, Suwanee, GA (US); HISENSE INTERNATIONAL CO., LTD., Qingdao, Shandong (CN)

( * ) Notice: Subject to any disclaimer, the term of this patent is extended or adjusted under 35 U.S.C. 154(b) by 0 days.

(21) Appl. No.: 14/547,531

(22) Filed: Nov. 19, 2014

(65) Prior Publication Data
US 2015/0363952 A1    Dec. 17, 2015

(30) Foreign Application Priority Data
Jun. 12, 2014  (CN) .......................... 2014 1 0257622

(51) Int. Cl.
*G06K 9/36* (2006.01)
*G06T 11/60* (2006.01)

(52) U.S. Cl.
CPC ....... *G06T 11/60* (2013.01); *G06T 2207/10004* (2013.01); *G06T 2207/20221* (2013.01)

(58) Field of Classification Search
CPC ......... G06T 3/4038; G06T 5/50; G06T 11/60; H04N 1/3876; H04N 5/23238
See application file for complete search history.

(56) References Cited

U.S. PATENT DOCUMENTS

| 7,292,261 B1 * | 11/2007 | Teo ................... H04N 5/23238 348/36 |
| 7,609,955 B2 * | 10/2009 | Motomura ............... G02B 3/10 396/77 |
| 8,345,956 B2 * | 1/2013 | Ward .................... G06T 7/0071 382/103 |
| 8,659,664 B2 * | 2/2014 | Benson ................... G01J 5/061 250/330 |
| 9,049,383 B2 * | 6/2015 | Yoon .................... H04N 5/2628 |
| 2013/0176337 A1 * | 7/2013 | Lu ......................... G06T 19/006 345/633 |
| 2013/0293678 A1 * | 11/2013 | He ........................ G06T 19/006 348/46 |

\* cited by examiner

*Primary Examiner* — Amir Alavi
(74) *Attorney, Agent, or Firm* — Boyle Fredrickson, S.C.

(57) ABSTRACT

The present disclosure provides an image obtaining method, a photographing apparatus and a storage medium. The image obtaining method includes the following operations: obtaining a plurality of images of a target scene at more than one focal lengths; processing a first image to obtain a reference image, wherein in the plurality of images, an image with a predetermined viewing angle is a standard image, and remaining images are first images, and image of the target scene in the reference image has same size as image of the target scene in the standard image; and substituting a clear area in the reference image for a corresponding area in the standard image.

20 Claims, 9 Drawing Sheets

PHOTOGRAPHING APPARATUS AND METHOD

The present application claims priority to Chinese Patent Application No. 201410257622.2, filed with the State Intellectual Property Office of China on Jun. 12, 2014 and entitled "All-in-focus image obtaining method and camera", which is hereby incorporated by reference in its entirety.

FIELD DISCLOSURE

The present disclosure relates to the field of image processing technologies, and in particular relates to an image obtaining method, a photographing apparatus and a storage medium.

BACKGROUND DISCLOSURE

To obtain the image of a scene or an object, a photographing apparatus is often used for taking an image.

The photographing apparatus may include a lens, a focusing component, a photosensitive element, an image storage device and the like. In the prior art, when an image is obtained, a specific focal length generally needs to be obtained by adopting the focusing component to adjust the focal length of the lens to a certain value, so that the scene which is focused on is clearly presented in the image. After a photographing signal is obtained, the photographing apparatus performs image photography, wherein the light reflected or emitted by the scene penetrates through the lens and is converted into image information in the photosensitive element, then the image information is stored in the image storage device.

SUMMARY DISCLOSURE

Some embodiments of the present disclosure provide an image obtaining method, which includes:

obtaining a plurality of images of a target scene at more than one focal lengths;

processing a first image to obtain a reference image, wherein in the plurality of images, an image with a predetermined viewing angle is a standard image, and remaining images are first images, and image of the target scene in the reference image has the same size as image of the target scene in the standard image; and substituting a clear area in the reference image for a corresponding area in the standard image.

Some embodiments of the present disclosure provide a photographing apparatus, which includes:

a lens and photosensitive and focusing components, configured to obtain a plurality of images of a target scene at more than one focal lengths;

a storage component, configured to store the plurality of images and computer-readable program codes; and an image processing component, configured to perform the computer-readable program codes in the storage component to implement:

processing a first image to obtain a reference image, wherein in the plurality of images, an image with a predetermined viewing angle is a standard image, and remaining images are first images, and image of the target scene in the reference image has the same size as image of the target scene in the standard image; and substituting a clear area in the reference image for a corresponding area in the standard image.

Some embodiments of the present disclosure provide a storage medium which stores computer-readable program codes, wherein the computer-readable program codes are executed by one or more processing components to implement:

obtaining a plurality of images of a target scene at more than one focal lengths;

processing a first image to obtain a reference image, wherein in the plurality of images, an image with a predetermined viewing angle is a standard image, and remaining images are first images, and image of the target scene in the reference image has the same size as image of the target scene in the standard image; and substituting a clear area in the reference image for a corresponding area in the standard image.

BRIEF DESCRIPTION OF THE DRAWINGS

To illustrate technical solutions in the embodiments of the present disclosure more clearly, a brief introduction of the drawings which are needed in the description of the embodiments is given below. Apparently, the drawings in the description below are merely some of the embodiments of the present disclosure, based on which other drawings can be obtained by those of ordinary skills in the art without any creative effort.

DETAILED DESCRIPTION OF THE EMBODIMENTS

A description of technical solutions in the embodiments of the present disclosure will be given below, in combination with the drawings of some embodiments of the present disclosure. Apparently, the embodiments described below are merely a part, but not all, of the embodiments of the present disclosure. All of the other embodiments, obtained by those of ordinary skills in the art based on the embodiments of the present disclosure without any inventive efforts, fall into the protection scope of the present disclosure.

The meanings indicated by reference signs in FIGS. 1-15 of some embodiments of the present disclosure include but are not limited to the following contents:

100 refers to photographing apparatus; 11 refers to lens, 12 refers to focusing component; 13 refers to photosensitive element; 14 refers to image processing component; 15 refers to image storage component; 21 refers to standard image; 22 refers to first image; 23 refers to reference image; 24 refers to image (such as all-in-focus image); O refers to origin of second coordinate system; O' refers to origin of first coordinate system; a, b, c, d, e, f and g refer to preset focal lengths; f1 refers to the distance between preset focal lengths a and b; f2 refers to the distance between preset focal lengths b and c; f3 refers to distance between preset focal lengths c and d; f4 refers to distance between preset focal lengths d and e; f5 refers to distance between preset focal lengths e and f, f6 refers to distance between preset focal lengths f and g; F1 refers to minimum focal length of target scene; F2 refers to maximum focal length of target scene; Z refers to first focusing range; A refers to clear imaging area of circular object in standard image; A' refers to fuzzy imaging area of circular object in first image; A" refers to enlarged A' area; B refers to clear imaging area of rectangular object in first image; B' refers to fuzzy imaging area of rectangular object in standard image; B" refers to enlarged B' area; m, n, p and q refer to focusing lengths of target scene: 01, 02, 03 and 04 refer to areas of standard image; C and D refer to second pure color areas; M refers to central point of second pure color area D; N refers to central point of second pure color area C; L2 refers to second distance; 01', 02', 03' and 04' refer to areas of first image; C' and D' refer to first pure color areas; M' refers to central point of first pure color area D'; N' refers to central point of first pure color area C'; and L1 refers to first distance.

Figure 1:
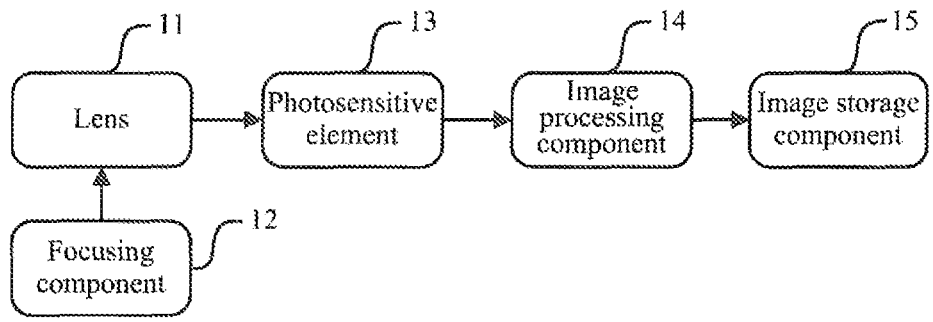
FIG. 1 is a block diagram of a photographing apparatus in some embodiments of the present disclosure.

As shown in FIG. 1, a photographing apparatus 100 for obtaining images according to some embodiments of the present disclosure includes a lens 11, a focusing component 12, a photosensitive element 13, an image processing component 14, an image storage component 15 and the like. The focusing component 12 may adjust the focal length of the lens 11 after obtaining a photographing indication, so that the lens 11 is focused at different focal lengths within the same angle; the lens 11 and the photosensitive element 13 may obtain images focused at different focal lengths; the image processing component 14 is configured to take the image with a minimum viewing angle in the images obtained by the lens 11 and the photosensitive element 13 as a standard image 21, take the remaining images as the images to be processed, which are referred to as first images 22, and amplify each first image 22 to obtain a reference image 23; the scene image in the clear area B" of the reference image 23 has the same size as the scene image in the corresponding area B' of the standard image 21; and finally, pixel values of the clear area B" in the reference image 23 are used for replacing pixel values of the corresponding area B' in the standard image 21 to obtain an image. In some embodiments of the present disclosure, the image acquired through the device of FIG. 1 may be an all-in-focus image. The images presented in the corresponding area B' and the clear area B" are images of the same object in the target scene, and the image with the minimum viewing angle may be preset as an image with the maximum or minimum focal length according to different types of lens.

Figure 2:
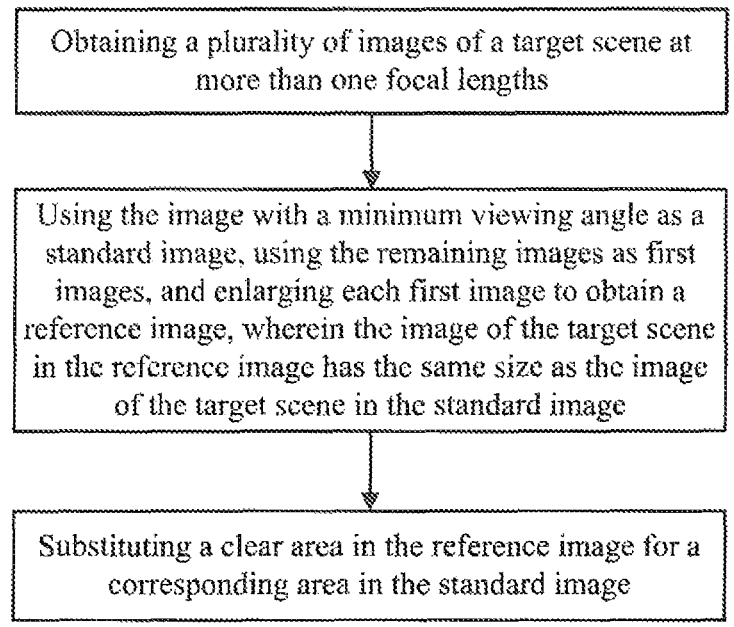
FIG. 2 is a flow diagram of an image obtaining method in some embodiments of the present disclosure.

As shown in FIG. 2, some embodiments of the present disclosure provide a method for obtaining images. The method may include the following operations: a plurality of images of a target scene are obtained at more than one focal lengths, wherein in the plurality of images, the image with a predetermined viewing angle may be used as a standard image 21, and the remaining images are used as the images to be processed, which are referred to as first images 22; a first image may be processed to obtain a reference image 23, wherein the image of the target scene in the reference image 23 has the same size as the image of the target scene in the standard image 21; and a clear area B" in the reference image 23 is used for replacing a corresponding area B' in the standard image 21 to obtain an image 24, wherein all target objects in the image 24 are clearly presented. The predetermined viewing angle may be determined according to different demands, e.g., the image with the predetermined viewing angle may be the one with a minimum viewing angle in the plurality of images. In addition, the first images may be processed by adopting an appropriate processing manner according to different demands, e.g., the first images may be enlarged. For example, in some embodiments, the image 24 may be an all-in-focus image.

Figure 3:
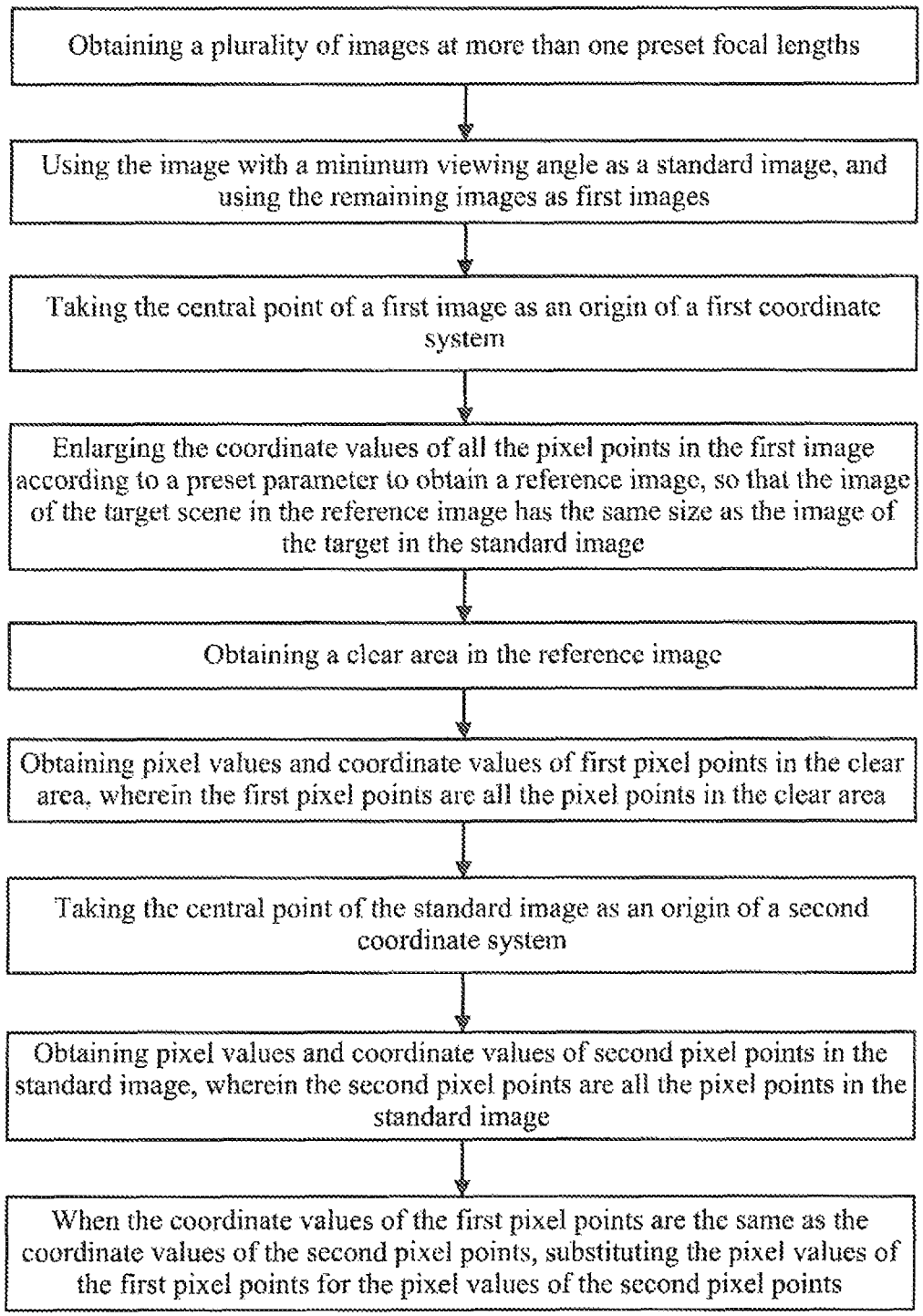
FIG. 3 is a flow diagram of an image obtaining method in some embodiments of the present disclosure.

Some embodiments of the present disclosure provide a method for obtaining images. As shown in FIG. 3, firstly, a plurality of images of a target scene may be obtained at more than one focal lengths, namely, the focusing component 12 adjusts the focal length of the lens 11, so that the photographing apparatus obtains the plurality of images of the target scene at more than one focal lengths. Then the image with a minimum viewing angle is used as a standard image, and the remaining images are used as first images. The coordinate values of all the pixel points in the first image are enlarged according to a preset parameter to obtain a reference image, wherein the central point of a first image is an origin of a first coordinate system, so that the image of the target scene in the reference image has the same size as the image of the target in the standard image. A clear area is obtained in the reference image. Pixel values and coordinate values of first pixel points in the clear area are obtained, wherein the first pixel points are all the pixel points in the clear area. Pixel values and coordinate values of second pixel points in the standard image are obtained, wherein the central point of the standard image is an origin of a second coordinate system, and the second pixel points are all the pixel points in the standard image. When the coordinate values of the first pixel points are the same as the coordinate values of the second pixel points, the pixel values of the first pixel points are substituted for the pixel values of the second pixel points.

Figure 4:
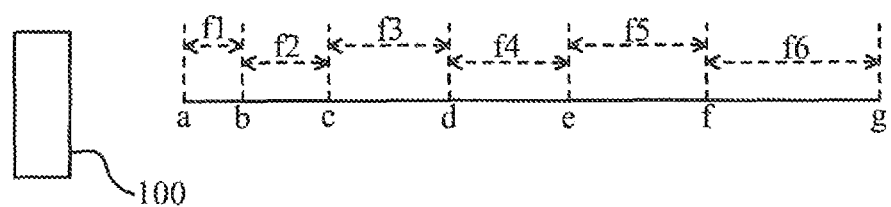
FIG. 4 is a manner of obtaining images at different preset focal lengths in some embodiments of the present disclosure.

In some embodiments, as shown in FIG. 4, the preset focal lengths may be a, b, c, d, e, f and g; f1 may be the distance between the preset focal lengths a and b; 2 may be the distance between the preset focal lengths b and c; f3 may be the distance between the preset focal lengths c and d; f4 may be the distance between the preset focal lengths d and e; f5 may be the distance between the preset focal lengths e and f, 16 may be the distance between the preset focal lengths f and g; and the differences between the preset focal lengths may have the following rules: f1<f2<f34<f5<f6, so that in a plurality of images, obtained by a photographing apparatus, of a target scene, the foreground part of the scene may have a plurality of focused pictures, while the background part has fewer focused pictures. The focusing component 12 enables the focal length of the lens 11 to be a, b, c, d, e, for g, and the photographing apparatus 100 may obtain the plurality of images of the target scene at all the preset focal lengths through the lens 11 and the photosensitive element 13.

Figure 5:
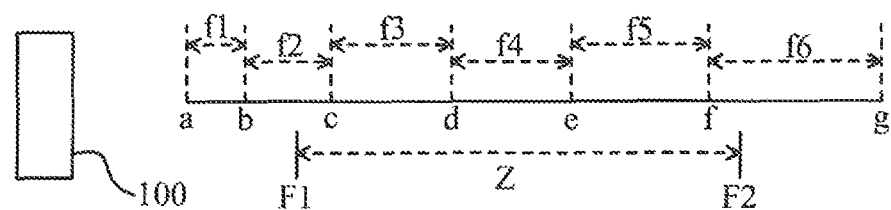
FIG. 5 is a manner of obtaining images at different preset focal lengths in some embodiments of the present disclosure.

In some embodiments, before the distance of the lens is adjusted, the photographing apparatus 100 acquires a first focal length range Z of the target scene and obtains the plurality of images at more than one preset focal lengths within the first focusing range Z. As shown in FIG. 5, the focal length range of the target scene is the first focal length range Z, wherein the minimum focal length of the target scene is F1, the maximum focal length of the target scene is F2, at the moment, the preset focal length of the photographing apparatus 100 may be a, b, c, d, e, for g, the preset focal lengths positioned in the first focusing range may be c, d, e and f, the photographing apparatus 100 obtains the plurality of images only at the preset focal lengths c, d, e and f, and in such a manner, the quantity of the acquired images may be reduced, so that the volume of data which needs to be processed when the image processing component 14 processes the images is reduced.

In addition, the image processing component 14 may fuse the plurality of acquired images, take the image with the minimum viewing angle in the plurality of acquired images as a standard image 21, take the remaining images as the images to be processed, which are referred to as first images 22 and amplify a first image 22 according to a preset parameter to obtain a reference image 23, wherein the scene image in the clear area B" of the reference image 23 may be as big as the scene image in the corresponding area B' of the standard image 21. The image with the minimum viewing angle is used as the standard image 21, so that scene information included in the standard image 21 may be the least, namely, the standard image 21 does not include part of image information at the edge of the first image 22, and the finally obtained image 24 does not include unclear areas.

Figure 6:
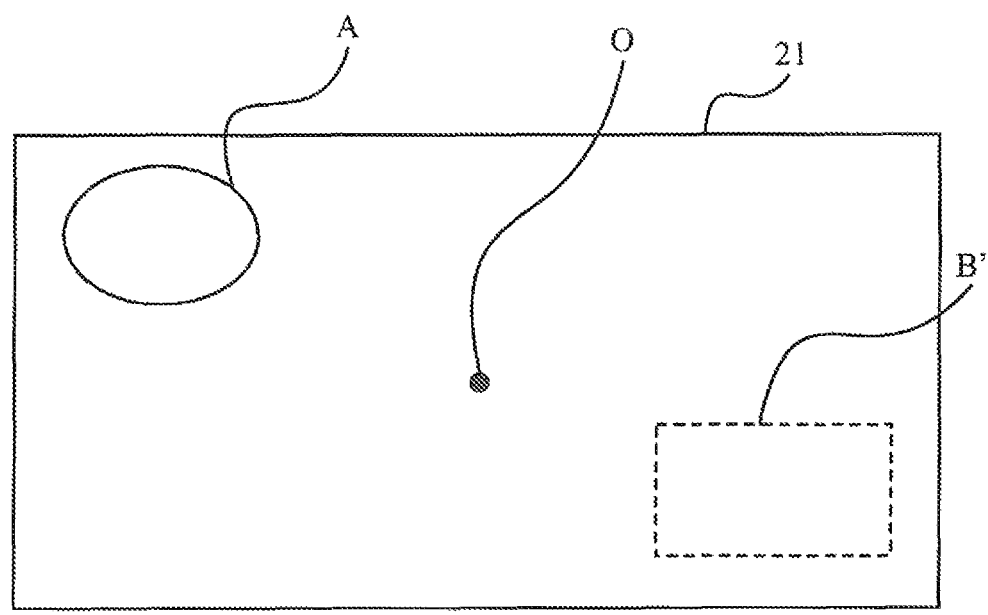
FIG. 6 is a standard image in some embodiments of the present disclosure.

In some embodiments, as shown in FIG. 6, the standard image 21 may include images of two objects, wherein the circular object may be presented as a clear image A, and the rectangular object may be presented as a fuzzy image B'. The first image 22, as shown in FIG. 7, may include two objects (namely, objects in FIG. 8), wherein the circular object is presented as a fuzzy image A', and the rectangular object is presented a clear image B.

Figure 7:
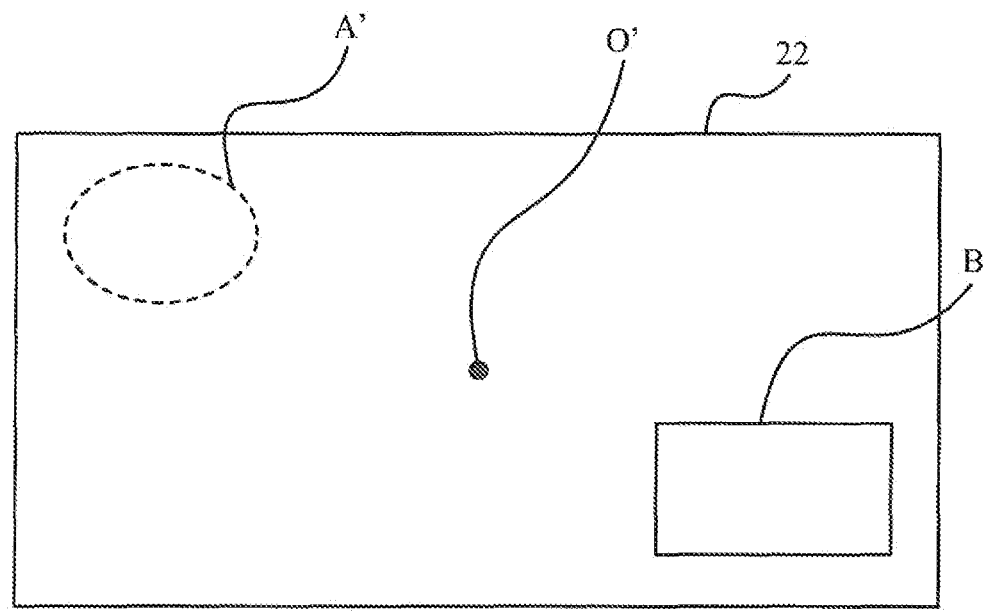
FIG. 7 is a first image in some embodiments of the present disclosure.
Figure 8:
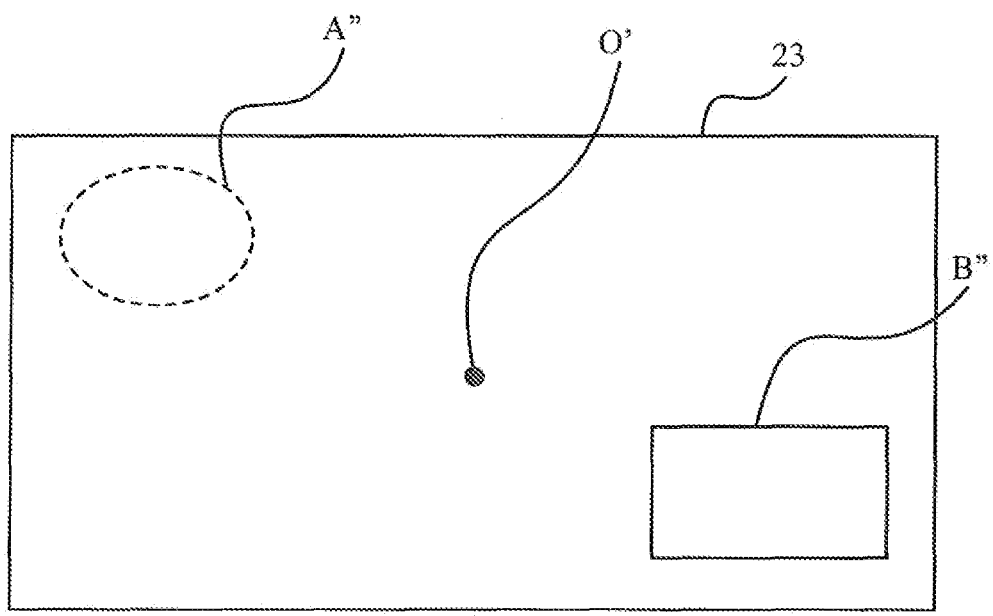
FIG. 8 is a reference image in some embodiments of the present disclosure.

It could be known in combination with FIG. 7 and FIG. 8 that, the operations of enlarging the first image 22 according to the preset parameter to obtain the reference image 23 may include: obtaining the central point O' of the first image 22; establishing a first coordinate system by using O' as a coordinate origin, and enlarging coordinate values of all pixel points in the reference image according to the preset parameter, so as to ensure that the rectangular object image in the clear area B" of the reference image 23 has the same size as the rectangular object image in the corresponding area B' of the standard image; and obtaining the reference image 23. The rectangular object image in the clear area B" of the reference image 23 may be as big as the rectangular object image in the corresponding area B' of the standard image 21, wherein the magnitude of the preset parameter is relevant to the focal length of the first image and the focal length of the standard image.

Next, the image processing component 14 may obtain the clear area B" in the reference image 23.

In the operation of substituting the clear area B" in the reference image 23 for the corresponding area B' in the standard image 21 to obtain the image 24, the image processing component may utilize the clear area B" in the reference image 23 to replace the fuzzy area B' in the standard image 21, so as to obtain the image 24, wherein all the target objects in the image 24 may be clearly presented.

Figure 9:
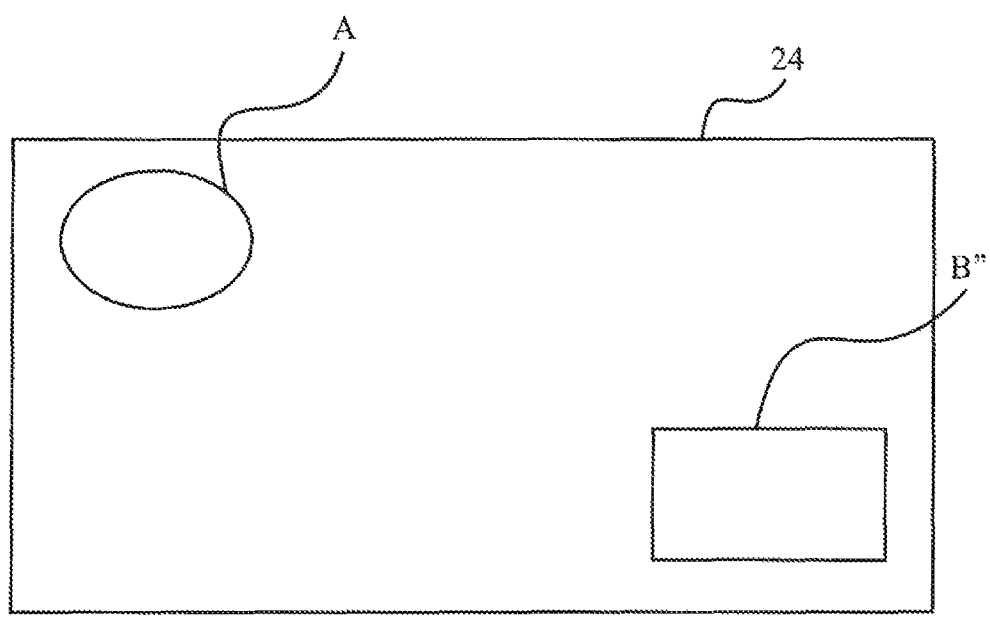
FIG. 9 is an image in some embodiments of the present disclosure.

In some embodiments, as shown in FIG. 6, FIG. 8 and FIG. 9, the image processing component 14 may obtain the pixel value of each pixel point in the clear area B" of the reference image 23 and the coordinate value of each pixel point in the first coordinate system, obtain the central point O in the standard image and use O as the coordinate origin of a second coordinate system, and obtain pixel values of second pixel points in the standard image 21 and coordinate values of the second pixel points in the second coordinate system; when the coordinate values of the first pixel points in the first coordinate system are the same as the coordinate values of the second pixel points in the first coordinate system, in the standard image 21, the image processing component 14 may utilize the pixel values of the first pixel points in the clear area B" of the reference image 23 to replace the second pixel values of the second pixel points in the standard image 21, so that the fussy area B' in the standard image is substituted into the clear area B" in the reference image 23 to obtain the image 24. Since the pixel value of each pixel point includes image information of an object image at the pixel point, the image 24 includes clear image information of the circular object and the rectangular object, so that both the circular object and the rectangular object are presented as clear images, to thereby overcome the defect that a part of a photographed image is clear and the other part is fuzzy in the prior art.

Figure 10:
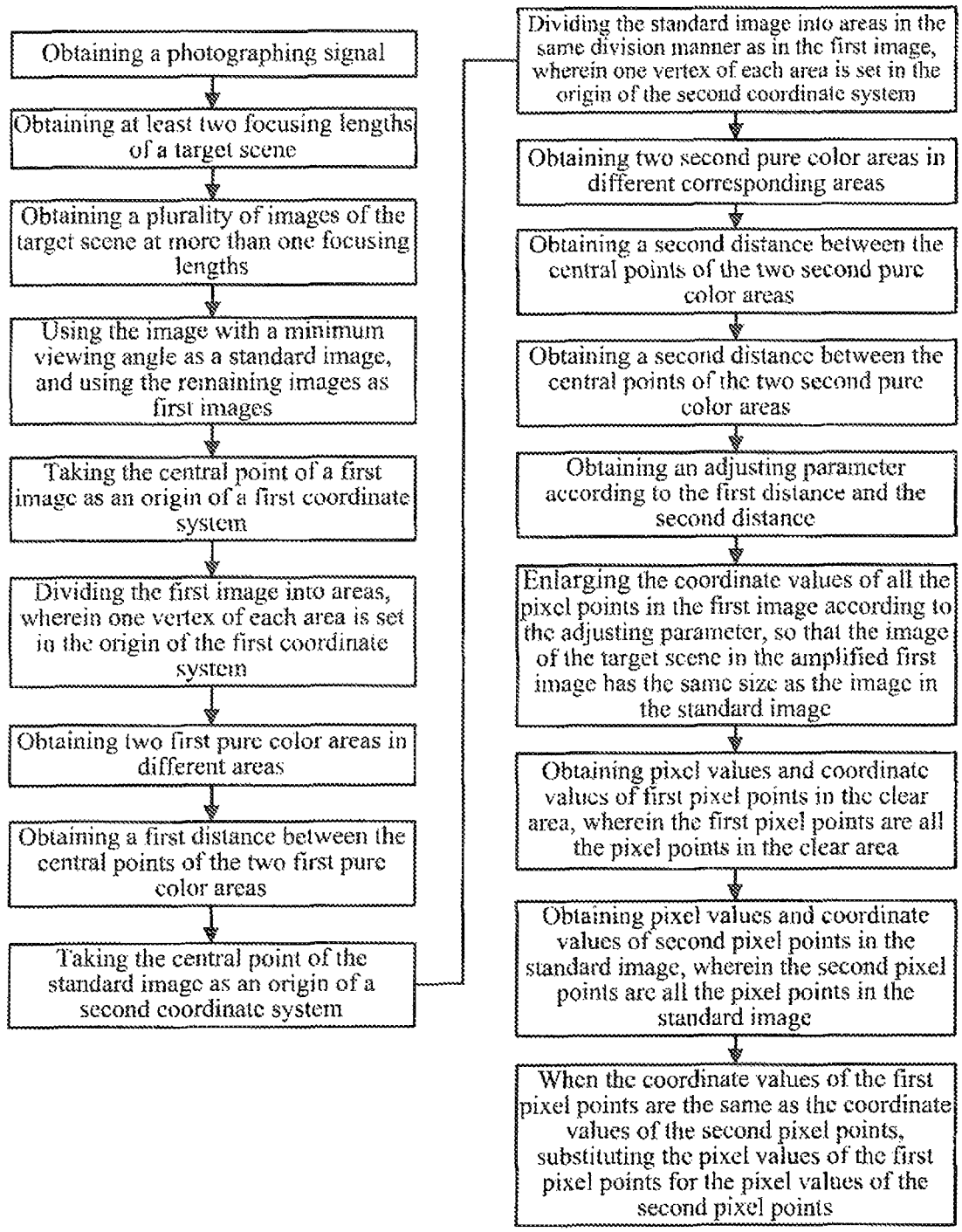
FIG. 10 is a flow diagram of an image obtaining method in some embodiments of the present disclosure.

Some embodiments of the present disclosure provide a method for obtaining images. As shown in FIG. 10, in the operation of obtaining images of a target scene at more than one focusing lengths, the focusing component 12 may adjust the focal length of the lens 11, so that the photographing apparatus obtains a plurality of images of the target scene at more than one focusing lengths. The image with a minimum viewing angle is used as a standard image, and the remaining images are used as first images. The coordinate values of all the pixel points in the first image is enlarged according to a preset parameter to obtain a reference image, wherein the central point of a first image herein is an origin of a first coordinate system. The first image is divided into areas, wherein one vertex of each area is set in the origin of the first coordinate system. Two first pure color areas in different areas and a first distance between the central points of the two first pure color areas are obtained. The standard image is divided into areas in the same division manner as in the first image, wherein one vertex of each area is set in the origin of the second coordinate system. Two second pure color areas in different corresponding areas are obtained. A second distance between the central points of the two second pure color areas is obtained. An adjusting parameter according to the first distance and the second distance is obtained. The coordinate values of all the pixel points in the first image are enlarged according to the adjusting parameter, so that the image of the target scene in the enlarged first image has the same size as the image in the standard image. Pixel values and coordinate values of first pixel points in the clear area are obtained, wherein the first pixel points are all the pixel points in the clear area. Pixel values and coordinate values of second pixel points in the standard image are obtained, wherein the second pixel points are all the pixel points in the standard image. When the coordinate values of the first pixel points are the same as the coordinate values of the second pixel points, the pixel values of the first pixel points are substituted for the pixel values of the second pixel points.

Figure 11:
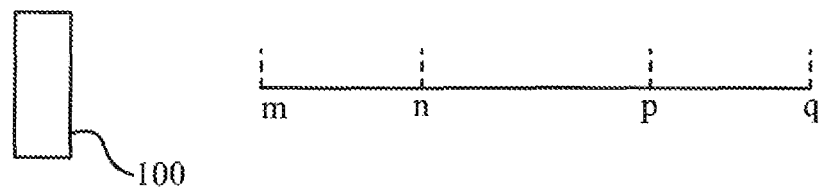
FIG. 11 is a manner of obtaining a plurality of images in some embodiments of the present disclosure.

In some embodiments, in combination with FIG. 10 and FIG. 11, the photographing apparatus 100 may automatically scan the obtained focusing lengths m, n, p and q of the target scene after obtaining a photographing signal, and obtain a plurality of images of the target scene at the focusing lengths m, n, p and q respectively.

In addition, the image processing component 14 may fuse the plurality of acquired images, take the image with the minimum viewing angle in the plurality of acquired images as a standard image 21, take the remaining images as images to be processed, which are referred to as first images 22 and amplify a first image 22 according to a preset parameter to obtain a reference image 23, wherein the scene image in the clear area B" of the reference image 23 may be as big as the scene image in the corresponding area B' of the standard image 21. The image with the minimum viewing angle is used as the standard image 21, so that scene information included in the standard image 21 may be the least, namely, the standard image 21 does not include part of image information at the edge of the first images 22, and the finally obtained image does not include unclear areas.

Figure 12:
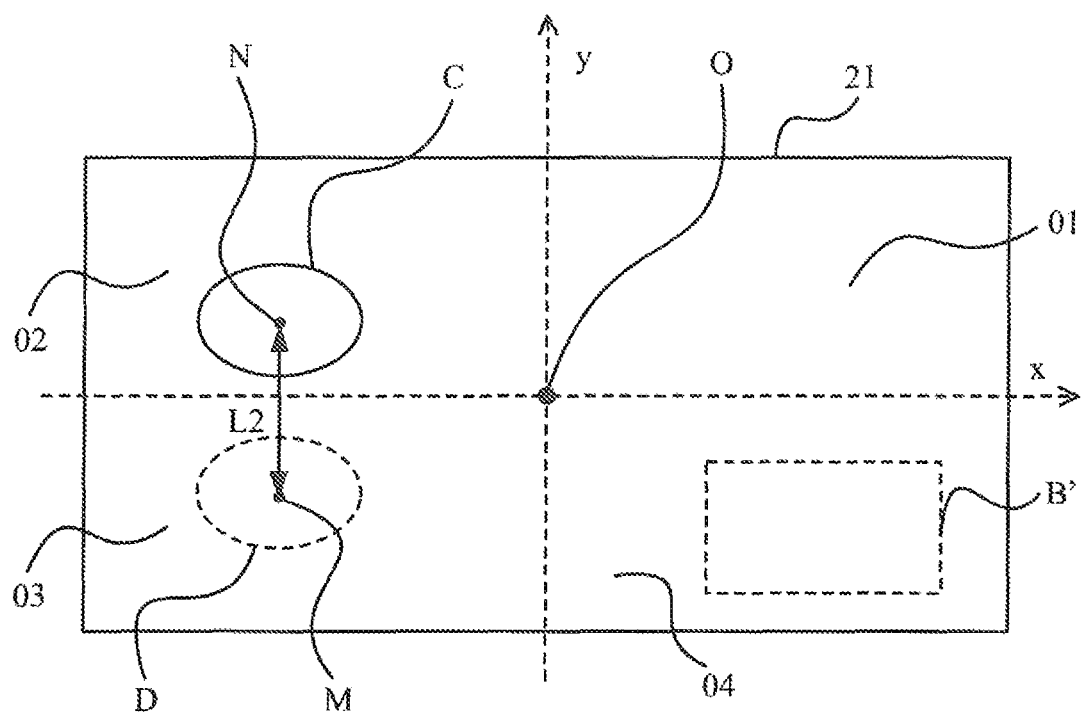
FIG. 12 is a standard image in some embodiments of the present disclosure.
Figure 13:
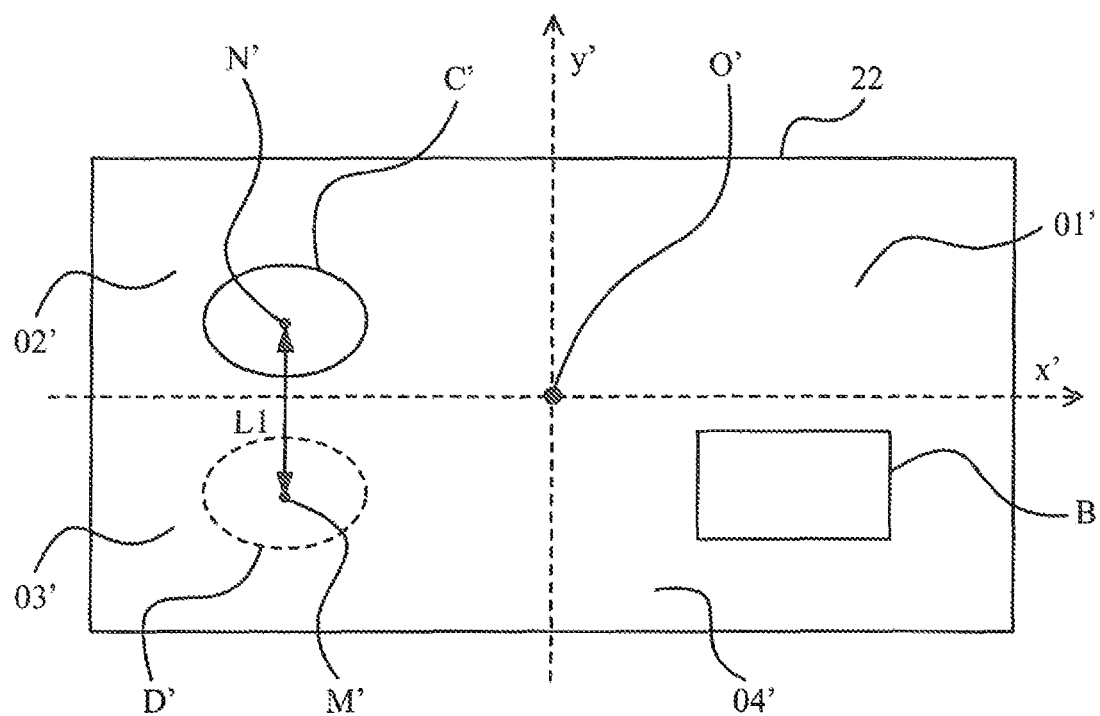
FIG. 13 is a first image in some embodiments of the present disclosure.
Figure 14:
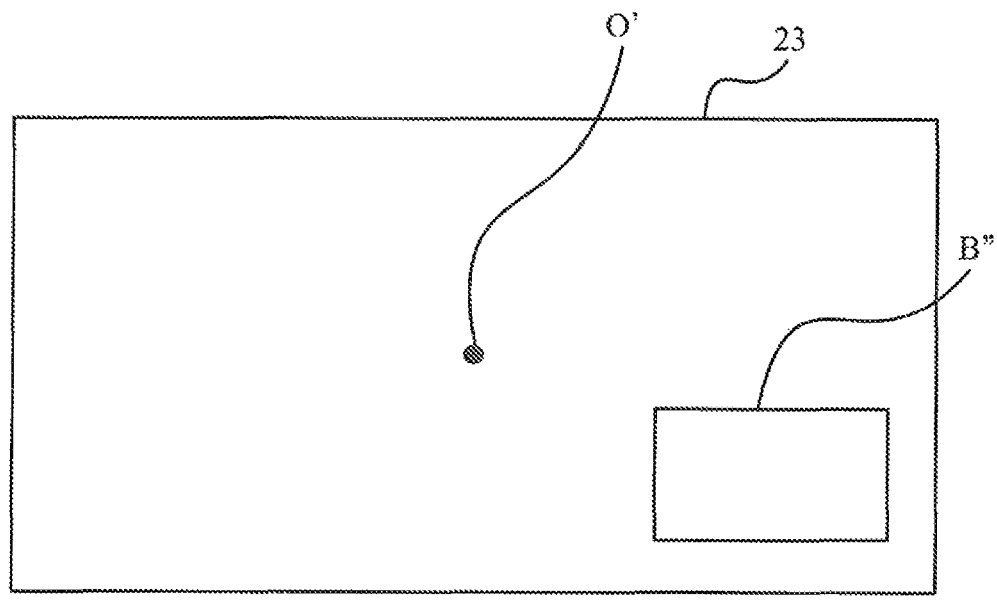
FIG. 14 is a reference image in some embodiments of the present disclosure.
Figure 15:
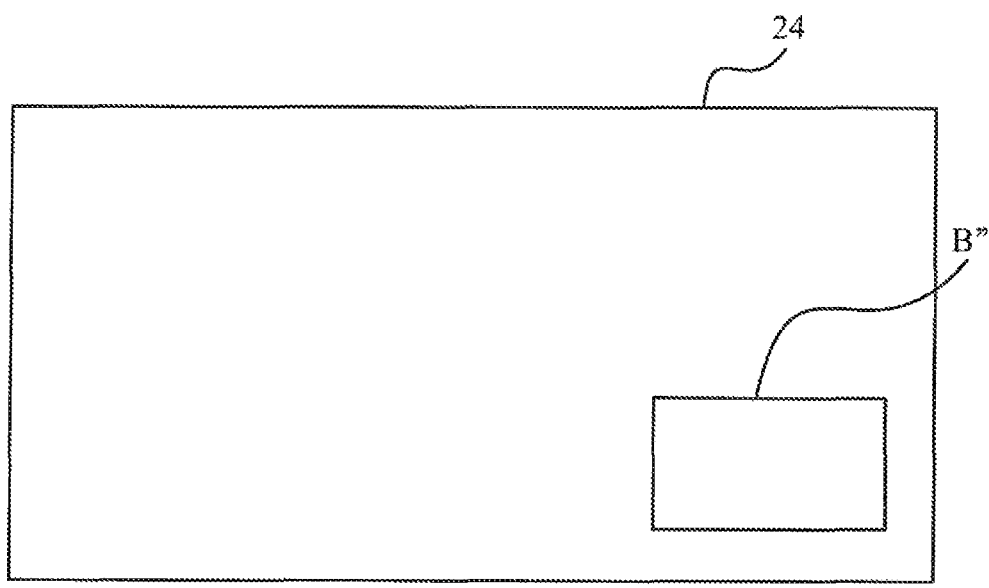
FIG. 15 is an image in some embodiments of the present disclosure.

In some embodiments, as shown in FIG. 10, FIG. 12 and FIG. 13, the fuzzy image of the rectangular object in the standard image 21 may form a fuzzy imaging area B, and the clear image in a first image 22 may form a clear imaging area B.

The central point O' of the first image 22 is acquired; a first coordinate system is established by using O' as a coordinate origin, coordinate values of all pixel points in the first image are acquired in the first coordinate system, wherein horizontal coordinates are referred to as x', vertical coordinates are referred to as y', the first image is divided into areas according to a certain rule, and the division rule in this embodiment is as follows: in 01' area, x'=y', and x'>0; in 02' area, x'=−y', and x'<0; in 03' area, x'=y', and x'<0; and in 04' area, x'=−y', and x'>0.

Pure color areas in different areas of the first image 22 are acquired, as shown in FIG. 13, the pure color area C' is positioned in the 02' area, the pure color area D' is positioned in the 03' area, the pure color areas C' and D' indicate that the area C' may be of a single color, and the area D' may be of a single color, the colors of the area C' and the area D' may be identical or different, the first central point N' of the pure color area C' and the first central point M' of the pure color area D' are further acquired, and the first distance L1 between the first central points M' and N' is further acquired.

The central point O of the standard image 21 is acquired; a second coordinate system is established by using O as a coordinate origin, coordinate values of all pixels in the standard image are acquired in the second coordinate system, wherein horizontal coordinates are referred to as x, vertical coordinates are referred to as y, the standard image is divided into areas according to a certain rule, and the division rule in some embodiments is as follows: in 01 area, x=y, and x>0; in 02 area, x=−y, and x<0; in 03 area, x=y, and x<0; and in 04 area, x=−y, and x>0. The 01 area corresponds to the 01' area, the 02 area corresponds to the 02' area, the 03 area corresponds to the 03' area, and the 04 area corresponds to the 04' area.

Pure color areas in different areas of the standard image 21 are acquired, as shown in FIG. 12, 02 in the standard image 21 is the corresponding area of the 02' area in the first image 22, 03 in the standard image 21 is the corresponding area of the 03' area in the first image 22, the pure color area C is positioned in the 02 area, the pure color area D is positioned in the 03 area, the pure color areas C and D indicate that the area C and the area D may be of single colors, the colors of the area C and the area D may be identical or different, the first central point N of the pure color area C and the first central point M of the pure color area D are further acquired, and the second distance L2 between the first central points M and N is further acquired.

The area C and the area C' are images of the same pure-color target scene in the standard image 21 and the first image 22 respectively, and the area D and the area D' are images of the same pure-color target scene in the standard image 21 and the first image 22 respectively.

It should be noted that, the acquisition of the first distance L1 and the second distance L2 may not be limited by sequence, the image processing component 14 may obtain the first distance L1 and then obtain the second distance L2, or obtain the second distance L2 and then obtain the first distance L1, or simultaneously obtain the first distance L1 and the second distance L2, and all the variations belong to the basic inventive thought of the present disclosure.

The image processing component may obtain an adjusting parameter according to the first distance L1 and the second distance L2, and amplify the coordinate values of all pixel points in the first image 22 according to the adjusting parameter, to obtain the reference image 23. The coordinate values of all the pixel points in the first image 22 are enlarged, so that the image of the to-be-imaged scene in the reference image 23 has the same size as the image of the to-be-imaged scene in the standard image 21. As mentioned in FIG. 15, the image of the rectangular object in the reference image 23 has the same size as the image of the rectangular object in the standard image 21, namely, the area B" in the reference image 23 has the same size as the area B' in the standard image 21.

Next, the image processing component 14 acquires the clear area B" in the reference image 23.

In the operation of substituting the clear area B" in the reference image for the corresponding area B' in the standard image to obtain the image 24, the image processing component may utilize the clear area B" in the acquired reference image 23 to replace the fuzzy area B' in the standard image 21 to obtain the image 24, and all the target objects in the image 24 may be clearly presented, so that the defect that a part of a photographed image is clear and the other part is fuzzy in the prior art may be overcome.

In some embodiments, as shown in FIGS. 12-15, the image processing component 14 acquires the pixel value of each pixel point in the clear area B" of the reference image 23 and the coordinate value of each pixel point in the first coordinate system, and acquires pixel values of second pixel points in the standard image 21 and coordinate values of the second pixel points in the second coordinate system; when the coordinate values of the first pixel points in the first coordinate system are the same as the coordinate values of the second pixel points in the second coordinate system, in the standard image 21, the image processing component 14 utilizes the pixel values of the first pixel points in the clear area B" of the reference image 23 to replace the second pixel values of the second pixel points in the standard image 21, so that the fussy area B' in the standard image is substituted into the clear area B" in the reference image 23 to obtain the image 24, wherein the circular object and the rectangular object in the image 24 may be presented as clear images, to thereby overcome the defect that a part of a photographed image is clear and the other part is fuzzy in the prior art.

The photographing apparatus provided by the embodiments of the present disclosure may further include an image display component, a photographing trigger component, a flash lamp and the like.

The photographing apparatus provided by the embodiments of the present disclosure may be a digital camera, a video camera or a portable mobile terminal with a photographing function such as a mobile phone or a PAD (personal assistant device), which is not limited by the embodiments of the present disclosure.

The foregoing descriptions are merely some embodiments of the present disclosure, while the protection scope of the present disclosure will not be limited thereto, those skilled in the art can make various modifications and variations to the present disclosure without departing from the scope of the present disclosure, thus the present disclosure is intended to encompass these modifications and variations thereto so long as the modifications and variations come into the scope of the present disclosure. Accordingly, the protection scope of the claims should be construed as the protection scope of the present disclosure.

The invention claimed is:

1. An image obtaining method, comprising:
   obtaining a plurality of images of a target scene at more than one focal lengths;
   processing a first image to obtain a reference image, wherein in the plurality of images, an image with a predetermined viewing angle is a standard image, and remaining images are first images, and image of the target scene in the reference image has same size as image of the target scene in the standard image; and
   substituting a clear area in the reference image for a corresponding area in the standard image.

2. The method of claim 1, wherein the obtaining a plurality of images of a target scene at more than one focal lengths comprises:
   obtaining a photographing signal; and
   obtaining the plurality of images of the target scene at more than one focal lengths according to preset focal lengths.

3. The method of claim 2, wherein the processing a first image to obtain a reference image comprises:
   enlarging coordinate values of all pixel points in the first image according to a preset parameter to obtain the reference image, wherein central point of the first image is an origin of a first coordinate system, and the image of the target scene in the reference image has same size as the image of the target scene in the standard image.

4. The method of claim 3, wherein the substituting a clear area in the reference image for a corresponding area in the standard image comprises:
   obtaining pixel values and coordinate values of first pixel points in clear area of the reference image, wherein the first pixel points are all pixel points in the clear area;
   obtaining pixel values and coordinate values of second pixel points in the standard image, wherein central point of the standard image is an origin of a second coordinate system, wherein the second pixel points are all pixel points in the standard image; and
   when the coordinate values of the first pixel points are the same as the coordinate values of the second pixel points, substituting the pixel values of the first pixel points for the pixel values of the second pixel points.

5. The method of claim 1, wherein the obtaining a plurality of images of a target scene at more than one focal lengths comprises:
   obtaining a photographing signal;
   obtaining a first focal length range of the target scene; and
   obtaining the plurality of images of the target scene at more than one focal lengths within the first focal length range according to preset focal lengths.

6. The method of claim 1, wherein the obtaining a plurality of images of a target scene at more than one focal lengths comprises:
   obtaining a photographing signal;
   obtaining at least two focusing lengths of the target scene; and
   obtaining the plurality of images of the target scene at more than one focusing lengths.

7. The method of claim 6, wherein the processing a first image to obtain a reference image comprises:
   obtaining an adjusting parameter according to the first image and the standard image; and
   enlarging coordinate values of all pixel points in the first image according to the adjusting parameter to obtain the reference image, wherein central point of the first image is an origin of a first coordinate system, and the image of the target scene in the reference image has same size as the image in the standard image.

8. The method of claim 7, wherein the obtaining the adjusting parameter according to the first image and the standard image further comprise:
   dividing the first image into areas, wherein one vertex of each area is set in the origin of the first coordinate system;
   obtaining a first distance between central points of two first pure color areas in different areas in the first image;
   dividing the standard image into areas in same division manner as in the first image, wherein central point of the standard image is an origin of a second coordinate system, and one vertex of each area is set in the origin of the second coordinate system;
   obtaining a second distance between central points of two corresponding second pure color areas in different areas in the standard image; and
   obtaining the adjusting parameter according to the first distance and the second distance.

9. The method of claim 8, wherein the substituting a clear area in the reference image for a corresponding area in the standard image comprises:
   obtaining pixel values and coordinate values of first pixel points in the clear area of the reference image, wherein the first pixel points are all pixel points in the clear area;
   obtaining pixel values and coordinate values of second pixel points in the standard image, wherein the second pixel points are all pixel points in the standard image; and
   when the coordinate values of the first pixel points are the same as the coordinate values of the second pixel points, substituting the pixel values of the first pixel points for the pixel values of the second pixel points.

10. The method of claim 1, wherein the image with the predetermined viewing angle is an image with a minimum viewing angle.

11. A photographing apparatus, comprising:
    a lens and photosensitive and focusing components, configured to obtain a plurality of images of a target scene at more than one focal lengths;
    a storage component, configured to store the plurality of images and computer-readable program codes; and
    an image processing component, configured to perform the computer-readable program codes in the storage component to implement:
    processing a first image to obtain a reference image, wherein in the plurality of images, an image with a predetermined viewing angle is a standard image, and remaining images are first images, and image of the target scene in the reference image has same size as image of the target scene in the standard image; and
    substituting a clear area in the reference image for a corresponding area in the standard image.

12. The photographing apparatus of claim 11, wherein the obtaining a plurality of images of a target scene at more than one focal lengths specifically comprises:
    obtaining a photographing signal; and
    obtaining the plurality of images of the target scene at more than one focal lengths according to preset focal lengths.

13. The photographing apparatus of claim 12, wherein the processing a first image to obtain a reference image comprises:

enlarging coordinate values of all pixel points in the first image according to a preset parameter to obtain the reference image, wherein central point of the first image is an origin of a first coordinate system, and the image of the target scene in the reference image has same size as the image of the target scene in the standard image.

14. The photographing apparatus of claim 13, wherein the substituting a clear area in the reference image for a corresponding area in the standard image comprises:
   obtaining pixel values and coordinate values of first pixel points in clear area of the reference image, wherein the first pixel points are all pixel points in the clear area;
   obtaining pixel values and coordinate values of second pixel points in the standard image, wherein central point of the standard image is an origin of a second coordinate system and the second pixel points are all pixel points in the standard image; and
   when the coordinate values of the first pixel points are the same as the coordinate values of the second pixel points, substituting the pixel values of the first pixel points for the pixel values of the second pixel points.

15. The photographing apparatus of claim 11, wherein the obtaining a plurality of images of a target scene at more than one focal lengths comprises:
   obtaining a photographing signal;
   obtaining a first focal length range of the target scene; and
   obtaining the plurality of images of the target scene at more than one preset focal lengths within the first focal length range according to preset focal lengths.

16. The photographing apparatus of claim 11, wherein the obtaining a plurality of images of a target scene at more than one focal lengths comprises:
   obtaining a photographing signal;
   obtaining at least two focusing lengths of the target scene; and
   obtaining the plurality of images of the target scene at more than one focusing lengths.

17. The photographing apparatus of claim 16, wherein the processing a first image to obtain a reference image comprises:
   obtaining an adjusting parameter according to the first image and the standard image; and
   enlarging coordinate values of all pixel points in the first image according to the adjusting parameter to obtain the reference image, wherein central point of the first image is an origin of a first coordinate system, and the image of the target scene in the reference image has same size as the image in the standard image.

18. The photographing apparatus of claim 11, wherein the image with the predetermined viewing angle is an image with a minimum viewing angle.

19. A non-transitory, computer readable storage medium for storing computer-readable program codes, wherein the computer-readable program codes are executed by one or more processing components to implement:
   obtaining a plurality of images of a target scene at more than one focal lengths;
   processing a first image to obtain a reference image, wherein in the plurality of images, an image with a predetermined viewing angle is a standard image, and remaining images are first images, and image of the target scene in the reference image has same size as image of the target scene in the standard image; and
   substituting a clear area in the reference image for a corresponding area in the standard image.

20. The non-transitory, computer readable storage medium of claim 19, wherein the image with the predetermined viewing angle is an image with a minimum viewing angle.

* * * * *